United States Patent [19]
Edmonds, Jr. et al.

[11] 3,877,970

[45] Apr. 15, 1975

[54] SELECTIVE CURING OF MULTIPLE LAYERS OF POLYARYLENE SULFIDE COATINGS

[75] Inventors: James T. Edmonds, Jr.; Jennings P. Blackwell, both of Bartlesville, Okla.

[73] Assignee: Phillips Petroleum Company, Bartlesville, Okla.

[22] Filed: Sept. 26, 1973

[21] Appl. No.: 400,906

[52] U.S. Cl. ............... 427/379; 260/79.1; 260/900
[51] Int. Cl. ...................... B44d 1/14; C08g 43/02
[58] Field of Search ............ 260/79.1, 900; 117/72, 117/75, 132 C, 132 CF, 123 D, 161 U Z, 161 R, 119.6

[56] References Cited
UNITED STATES PATENTS

| | | |
|---|---|---|
| 3,487,454 | 12/1969 | Oates et al..................... 260/79.1 X |
| 3,492,125 | 1/1970 | Ray........................................ 426/523 |
| 3,622,376 | 11/1971 | Tieszen et al.................. 260/79.1 X |

*Primary Examiner*—Ralph Husack

[57] ABSTRACT

An arylene sulfide coating composition containing a fluorocarbon polymer is applied as a first or base coat to a substrate and cured under conditions to give only a partial cure. Multiple base coats can be applied and each partially cured prior to application of the next coat. Thereafter a single top coat of poly(arylene sulfide) is applied and the final coating cured under normal curing conditions.

10 Claims, No Drawings

SELECTIVE CURING OF MULTIPLE LAYERS OF POLYARYLENE SULFIDE COATINGS

BACKGROUND OF THE INVENTION

This invention relates to the application of coatings of arylene sulfide polymer to a substrate.

Arylene sulfide polymers are known for their desirable characteristics as coating compositions. It is also broadly known that these coatings like other coatings can be applied in multiple layers as shown for instance in Ray U.S. Pat. No. 3,492,125. It is also broadly known to incorporate a fluorocarbon polymer with an arylene sulfide polymer as shown in Oates et al., U.S. Pat. No. 3,487,454. However efforts to produce coatings using multiple layers of arylene sulfide polymer containing a fluorocarbon polymer have been found to result in a poor quality final product.

BRIEF SUMMARY OF THE INVENTION

It is an object of this invention to provide a method of applying arylene sulfide coating compositions containing fluorocarbon polymer in multiple layers; and it is yet a further object of this invention to provide an improved arylene sulfide polymer-coated substrate.

In accordance with this invention at least one base coat of arylene sulfide polymer containing a fluorocarbon polymer is cured under a time and temperature relationship such as to give incomplete curing; thereafter a top coat is applied and the composite cured under normal curing conditions to give a relatively complete cure.

DESCRIPTION OF THE PREFERRED EMBODIMENTS

The instant invention is applicable to the preparation of multiple layer coatings of arylene sulfide polymer containing a relatively low molecular weight polytetrafluoroethylene. By relatively low molecular weight polymers is meant polymers which exhibit at least some flow in the ASTM D 1238 melt flow test at 380°C using a 5000 g weight. Preferred polymers have a number average molecular weight of less than about 10 million. Polymers exhibiting a melt viscosity of $1 \times 10^4$ to $1 \times 10^5$ poises are particularly suitable.

A determination of melt flow of PTFE is made according to ASTM-1238, Condition E, modified to operate at 380°C. The amount of polymer extruded in one minute is determined using a 5,000 $g$ weight on the plunger.

The melt viscosity is related to melt flow by the following formula:

melt viscosity, $\eta = (K \times$ wt. applied (in grams)/melt flow (g/minute))

$K = 10.63$ and is a factor which has to be determined for each polymer. This value is used by FDA in its test to determine the suitability of PTFE in food coating acceptability.

No determination of melt viscosity can be made if, under the conditions of the melt flow test, no flow occurs, i.e., the melt flow is essentially $= 0$.

Exemplary low molecular weight fluorocarbon materials include polytetrafluoroethylene sold under the trademark TL-126 by the LNP Corporation, having a melt viscosity of $4 \times 10^4$ poises as calculated from melt flow determinations by said ASTM D 1238 test, and polytetrafluoroethylene sold under the trademark Whitcon (WC-5), Whitcon (WC-6), and Whitcon (WC-8) sold by Pennwalt Corporation having melt viscosities of $3.9 \times 10^4$, $5.1 \times 10^4$, and $7.4 \times 10^4$ poises respectively as calculated in accordance with said ASTM test and formula given above. While high molecular weight fluorocarbon polymer such as Teflon T-5 polymer can be present it is possible to obtain smooth coatings with such high molecular weight fluorocarbon polymer without using the time and temperature relationships of the invention to effect the cure. Teflon T-5 polymer has a number average molecular weight of $9.55 \times 10^7$. Teflon dispersion 30-B polymer has a number average molecular weight of $2.63 \times 10^6$ and sometimes gives improved results using the invention while at other times a satisfactory coating can be obtained without the steps of the invention. The Teflon T-5 and 30-B polymers have no flow under the ASTM D 1238 test. These molecular weights are determined using the equation $$\log_{10}\overline{M}_n = (2.612 - S.S.G./0.058)$$

as set out by C. A. Sterati and H. W. Stackwether Advances in Polymer Science Vol. II 465 (1960–61). S.S.G. stands for Standard Specific Gravity.

The invention is applicable to the production of coatings of any normally solid, heat curable high molecular weight arylene sulfide polymer. The preferred arylene sulfide polymer is poly(phenylene sulfide) (PPS) having a melting or softening point of at least 300°F, preferably 400° to 850°F. Such polymer can be made in accordance with Edmonds et al., U.S. Pat. No. 3,354,129, the disclosure of which is hereby incorporated by reference.

The composition can contain other conventional additives such as stabilizers, and the like. The presence of pigments such as titanium dioxide or black iron oxide is preferred.

The initial coating is cured under a time and temperature relationship such as to give substantial undercure. The curing temperature is within the range of 225° to 610°F for a time in minutes ($t$) no more than that represented by the formula $t = (-T/20) + 62$ wherein $T$ is an integer corresponding to said temperature in °F. The minimum temperature applicable is 225°F because it is necessary to drive off water. The maximum temperature is 610°F because at higher temperatures complete curing can occur. Preferably the temperature will be within the range of 250° to 600°F. The maximum time thus can vary from a matter of about 32 minutes at 610°F to approximately 51 minutes at 225°F. Preferably the time in minutes ($t$) employed will be at least an amount represented by the formula $t = -T/60 + 16$ wherein T is said integer corresponding to said temperature. The first cure can quite advantageously be conducted at a temperature just below the melting point of the polymer. Times of 10 to 30 minutes at a temperature of 500° to 600°F are particularly suitable. After application of a top coat the thus coated substrate is cured in a normal manner at a temperature within the range of 650° to 900°F for a time in minutes ($t'$) greater than that represented by the formula $t' = (-2T'/25) + 77$ wherein T' is an integer corresponding to the temperature of the second cure in °F, preferably a temperature in the range of 700° to 800°F for a time of at least 30, preferably 30 to 60 minutes. Again, obviously the coatings can be cured at the higher temperature with the shorter times.

The thickness of each coating can vary from 0.25 to 25 mils with the total thickness generally being in the range of 0.5 to 50 mils or more.

The coatings can be applied in the form of a slurry in a liquid such as water or glycol or can be sprayed on in the form of a dry powder. A substrate can be hot enough on initial contact with the polymer to melt same or a cold substrate can be used with the polymer being melted during the cure.

The substrate may be any metal, glass, ceramic or plastic material which will form an adhesive bond with the arylene sulfide polymer coating formulation and which retains its rigidity and shape and does not decompose or deteriorate at the curing temperature for the required time.

The coated articles made in accordance with this invention can be used in any application where protective coating is required. They are of particular utility in the production of coated cookware.

Typical slurry compositions contain by weight: 100 parts arylene sulfide polymer: 5–60, preferably 10–40, more preferably 10–15, parts by weight of a fluorocarbon polymer; and preferably 10–50 parts by weight of pigment-filler such as titanium dioxide ($TiO_2$), iron oxide ($Fe_3O_4$), carbon black or a combination of these. The slurry is preferably an aqueous dispersion containing 0.5 – 2 wt percent of a non-ionic surfactant, such as octylphenoxypolyethoxyethanol. Other liquids may be used such as glycol, water-glycol, light hydrocarbons, such as pentane, hexane, benzene, toluene, or mixtures of these. Solids contents may vary from 20–60 percent by weight depending on the method of applying the coating such as by brushing, dipping, spraying, etc. For spraying the preferred solids contents is between 25–35 by weight percent.

EXAMPLE

The following 25 runs were made by preparing the slurries as follows. The materials used which are not identified hereinabove were as follows.

Poly(phenylene sulfide), Ryton PPS, Grade V-1, virgin polymer, melt flow 2,000, ASTM - D1238-65T, Condition L, modified to operate at 343°C
$TiO_2$, DuPont R-101
$Fe_3O_4$, Pfizer Black Oxide, BK-5099
Carbon Black (C), Channel Black, Monarch 74, Cabot Corp.
Octylphenoxypolyethoxyethanol, Triton X-100, nonionic wetting agent, Rohm and Haas The fluorocarbon polymers used in preparing the coatings in accordance with the invention were of fine particle size, specifically 200 mesh (75 microns) or less. The WC-5, WC-6, and WC-8 polymers had a particle size of less than 1 micron. The TL–126 polymer had a particle size of 8 microns. The T-5 polymer had a particle size of 325 microns and finally the 30-B polymer had a particle size of less than 0.5 micron average particle size diameter.

In the preparation of the slurries containing low molecular weight polytetrafluoroethylene (products sold under the trademarks WC-5, WC-6, WC-8 and TL-126), water and wetting agent were blended together in a Waring blender and then the dry ingredients, polyphenylene sulfide (PPS), pigment, and polytetrafluoroethylene (PTFE) were added and blended for about 5 minutes. The slurry was then poured into a ball mill jar half full of one-half inch burundum grinding rods until the rods were just covered, and the slurry was then ball milled overnight or longer.

In the preparation of the slurries containing high molecular weight molding grade PTFE a wet milling procedure was used wherein a blend of the molding grade PTFE (a product by DuPont sold under the trademark Teflon T-5) in water and wetting agent was ball milled for 24 hours or longer. The PPS and pigment were then added and ball milling continued overnight or longer.

To incorporate the dispersion grade fluorocarbon polymer (a product sold under the trademark Teflon 30-B by DuPont) a slurry of PPS and pigment was prepared by ball milling the ingredients in water and Triton X-100 wetting agent. Then this slurry was slowly added to the Teflon 30-B polymer dispersion with gentle stirring. The weights of the PPS slurry and Teflon 30-B polymer dispersion were calculated to give the desired proportion of ingredients in the final slurry. Ball milling, or rapid stirring of mixtures with Teflon 30-B polymer caused coagulation of the polytetrafluoroethylene dispersion and thus had to be avoided.

A Binks model 18 spray gun with siphon feed was used for coating. Coatings were tested by spraying aluminum test coupons 3×6 inches and curing in an air vented oven at the desired temperature.

Coatings were evaluated by feel, visual observation, and appearance under 20X magnification.

TABLE I

DOUBLE COATS WITH PPS/PIGMENT/PTFE SLURRIES

| RUN No. | PRIMER COAT | | | | TREATMENT OF PRIMER COAT | TOP COAT | | | | AP-PEAR-ANCE (c) | AD-HES-ION (d) |
|---|---|---|---|---|---|---|---|---|---|---|---|
| | PIGMENT (a) | POLYTETRA-FLUORO-ETHYLENE (a) | TRITON X-100 (b) | CURE (min/F) | | PIGMENT (a) | POLYTETRA-FLUORO-ETHYLENE (a) | TRITON X-100 (b) | CURE (min/F) | | |
| 1 | 33 $TiO_2$ | 10 TL-126 | 1 | 30/700 | None | 33 $TiO_2$ | 10 TL-126 | 1 | 30/700 | Poor | Good |
| 2 | 33 $TiO_2$ | 10 TL-126 | 1 | 30/500 | do. | 33 $TiO_2$ | 10 TL-126 | 1 | 30/700 | Even | Good |
| 3 | 33 $TiO_2$ | 10 TL-126 | 1 | 30/700 | Rinsed with 1% X-100 | 33 $TiO_2$ | 10 TL-126 | 1 | 30/700 | Poor | Good |
| 4 | 33 $TiO_2$ | 10 TL-126 | 1 | 30/500 | Rinsed with 1% X-100 | 33 $TiO_2$ | 10 TL-126 | 1 | 30/700 | Even | Good |
| 5 | 33 $TiO_2$ | 10 TL-126 | 1 | 30/700 | Grit-blasted | 33 $TiO_2$ | 10 TL-126 | 1 | 30/700 | Poor | Good |
| 6 | 33 $Fe_3O_4$ | 10 TL-126 | 1 | 30/500 | Rinsed with 1% X-100 | 33 $Fe_3O_4$ | 10 TL-126 | 1 | 30/700 | Even | Good |
| 7 | 33 $Fe_3O_4$ | 10 TL-126 | 1 | 30/700 | Rinsed with 1% X-100 | 33 $Fe_3O_4$ | 10 TL-126 | 1 | 30/700 | Uneven | Good |

TABLE I —Continued

DOUBLE COATS WITH PPS/PIGMENT/PTFE SLURRIES

| RUN No. | PIGMENT (a) | PRIMER COAT POLYTETRA-FLUORO-ETHYLENE (a) | TRITON X-100 (b) | CURE (min/F) | TREATMENT OF PRIMER COAT | PIGMENT (a) | TOP COAT POLYTETRA-FLUORO-ETHYLENE (a) | TRITON X-100 (b) | CURE (min/F) | APPEARANCE (c) | ADHESION (d) |
|---|---|---|---|---|---|---|---|---|---|---|---|
| 8 | 33 TiO$_2$ | 10 WC-5 | 1 | 30/500 | — | 33 TiO$_2$ | 10 WC-5 | 1 | 30/700 | Even | Good |
| 9 | 33 TiO$_2$ | 10 WV-5 | 1 | 30/700 | — | 33 TiO$_2$ | 10 WC-5 | 1 | 30/700 | Poor | Fair |
| 10 | 15 Fe$_3$O$_4$ | 15 WC-5 | 1 | 30/500 | — | 15 Fe$_3$O$_4$ | 15 WC-5 | 1 | 30/700 | Even | Good |
| 10a | 15 Fe$_3$O$_4$ | 15 WC-5 | 1 | 30/600 | — | 15 Fe$_3$O$_4$ | 15 WC-5 | 1 | 30/725 | Even | Good |
| 11 | 33 TiO$_2$ | 10 WC-6 | 1 | 30/500 | — | 33 TiO$_2$ | 10 WC-6 | 1 | 30/700 | Even | Good |
| 12 | 33 TiO$_2$ | 10 WC-6 | 1 | 30/700 | — | 33 TiO$_2$ | 10 WC-6 | 1 | 30/700 | Poor | Poor |
| 13 | 20 Fe$_3$O$_4$ | 10 WC-6 | 1 | 30/500 | — | 20 Fe$_3$O$_4$ | 20 WC-6 | 1 | 30/700 | Even | Good |
| 14 | 33 TiO$_2$ | 10 WC-8 | 1 | 30/500 | — | 33 TiO$_2$ | 10 WC-8 | 1 | 30/700 | Even | Good |
| 15 | 33 TiO$_2$ | 10 WC-8 | 1 | 30/700 | — | 33 TiO$_2$ | 10 WC-8 | 1 | 30/700 | Poor | Poor |
| 16 | 12.5 TiO$_2$ | 12.5 WC-8 | 1 | 30/500 | — | 12.5 TiO$_2$ | 12.5 WC-8 | 1 | 30/700 | Even | Good |
| 17 | 12.5 TiO$_2$ | 12.5 WC-8 | 1 | 30/700 | — | 12.5 TiO$_2$ | 12.5 WC-8 | 1 | 30/700 | Poor | Poor |
| 18 | 15 Fe$_3$O$_4$ | 15 WC-8 | 1 | 30/500 | — | 15.0 Fe$_3$O$_4$ | 15 WC-8 | 1 | 30/700 | Even | Good |
| 19 | 33 Fe$_3$O$_4$ | 10 T-5 | 1 | 30/700 | — | 33 Fe$_3$O$_4$ | 10 T-5 | 1 | 30/700 | Even | Good |
| 20 | 33 TiO$_2$ | 10 30-B | — | 60/600 | — | 33 TiO$_2$ | 10 30-B | — | 60/650 | Rough | Poor |
| 21 | 33 TiO$_2$ | 10 30-B | — | 30/500 | — | 33 TiO$_2$ | 10 30-B | — | 60/650 | Even | Good |
| 22 | 40 TiO$_2$ + 10C | 50 30-B | 2 | 30/250 | — | 40 TiO$_2$ + 10C | 50 30-B | 2 | 30/700 | Even | Fair |
| 23 | 33 TiO$_2$ | 10 30-B | 1 | 10/500 | — | 33 TiO$_2$ | 10 30-B | 1 | 30/700 | Even | Good |
| 24 | 40 TiO$_2$ + 10C | 50 30-B | 2 | 30/700 | — | 40 TiO$_2$ + 10C | 50 30-B | 2 | 30/700 | Even | Poor |

(a) Parts by weight per 100 parts by weight PPS.
(b) % X-100 in water used in making slurry.
(c) Even = Top coat completely covers primer; Uneven = Incomplete coverage or spreading by top coat; Poor = Beading of top coat.
(d) Rated by using scalpel under 20X magnification to try to pick off top coat.

Runs 1–7 were made with a single grade PTFE, all containing 10 parts by wt. PTFE TL-126, melt viscosity $4 \times 10^4$ poise. Two kinds of fillers were used, TiO$_2$ and Fe$_3$O$_4$ and the first coat was treated as indicated. At a first coat curing temperature of 700°F for 30 minutes, the coating appearance was always "poor", while if the first coat was cured at 500°F, both appearance and adhesion were good. In runs 8–24, no treatment of the primer coat was made since it had been shown to be ineffective in improving the appearance or adhesion of the second coat. Runs 8–9 are comparable, again showing differences due to curing temperature difference. Run 10 is included to show that other levels of fillers and PTFE can be used. The rest of the table follows the same pattern. Run 19 was made with a molding grade PTFE T-5 which exhibits "no flow" when melt viscosity is measured. This resin is outside the scope of the invention because the special cure temperature did not appear to be required for this type of material. A comparison of runs 20 and 21 shows the advantage for the invention as opposed to curing the first coat at 600°F for 60 minutes although as can be seen by comparing these runs with run 24, it is possible to achieve good results without the invention with this relatively high molecular weight fluorocarbon polymer. Run 22 shows that as the amount of fluorocarbon polymer reaches 50 parts per hundred PPS the adhesion is adversely affected.

While this invention has been described in detail for the purpose of illustration, it is not to be construed as limited thereby but is intended to cover all changes and modifications within the spirit and scope thereof.

What is claimed is:

1. A method for coating a substrate with an arylene sulfide polymer composition comprising: applying at least one base coat of said arylene sulfide polymer containing a fluorocarbon polymer of sufficiently low molecular weight to exhibit some flow under ASTM D 1238 melt flow test at 380°C with a 5000 g weight, and curing said thus formed base coat at a first elevated temperature within the range of 225° to 610°F for a time, $t$ in minutes, no more than an amount represented by the equation $t = (-T/20) + 62$ wherein T is an integer corresponding to said first elevated temperature in °F, so as to give an incomplete cure; and thereafter applying a top coat of arylene sulfide polymer containing a fluorocarbon polymer and subjecting the thus-coated substrate to a second elevated temperature within the range of 650° to 900°F for a time in minutes, $t'$, greater than that represented by the formula $t' = (-2T'/25) + 77$ wherein T' is an integer corresponding to said second elevated temperature in °F, to give a relatively complete cure.

2. A method according to claim 1 wherein said first elevated temperature is within the range of 250° to 600°F.

3. A method according to claim 1 wherein said first elevated temperature is below the melting point of said arylene sulfide polymer.

4. A method according to claim 1 wherein said fluorocarbon polymer is polytetrafluoroethylene having a melt viscosity within the range of $1 \times 10^4$ and $1 \times 10^5$ poise as calculated from flow obtained by said ASTM test.

5. A method according to claim 1 wherein said arylene sulfide polymer is polyphenylene sulfide.

6. A method according to claim 1 wherein said substrate is one of metal or ceramic.

7. A method according to claim 1 wherein said fluorocarbon polymer in each of said coats is present in an amount within the range of 10 to 40 weight per cent based on the weight of said arylene sulfide polymer in each coat.

8. A method according to claim 1 wherein said time, $t$ in minutes, is at least an amount represented by the equation $t = (-T/60) + 16$ where T is said integer corresponding to said first elevated temperature.

9. A method according to claim 1 wherein each of said coats is applied in the form of an aqueous slurry containing a non-ionic surfactant and wherein said fluorocarbon polymer is present in each of said slurries in an amount within the range of 10 to 15 parts by weight based on 100 parts by weight of said arylene sulfide polymer in that slurry and wherein each of said slurries comprises in addition 10–50 parts by weight of a pigment based on 100 parts by weight of said arylene sulfide polymer in that slurry.

10. A method according to claim 1 wherein said base coat is cured at a temperature within the range of 500° to 600°F for a time within the range of 10 to 30 minutes and said coated substrate after application of said top coat is cured at a temperature within the range of 700° to 800°F for a time within the range of 30 to 60 minutes.

* * * * *